United States Patent Office 3,184,352
Patented May 18, 1965

3,184,352
SOLVENT PROCESS FOR PREPARING EPOXY-BASE PROPELLANTS
Walter S. Baker, Yucaipa, Calif., assignor to the United States of America as represented by the Secretary of the Army
No Drawing. Filed Jan. 10, 1964, Ser. No. 337,107
8 Claims. (Cl. 149—19)

This invention concerns a propellant with improved burning and physical characteristics and a process for its preparation.

Solid propellants are usually produced by adding an inorganic oxidizer to an organic plastic material, which forms the fuel binder, and casting the composite. Of importance in the formulation of propellant compositions is the fact that with the addition of the large amounts of inorganic oxidizer required for completeness of combustion, the physical strength and toughness of the resulting castings are diminished. This can result in propellant grains which break easily and cause irregular burning rates.

The present invention relates to epoxy propellant compositions which contain large amounts of oxidizer and are capable of forming castings with advantageous physical properties.

Epoxy resins, because of their chemical resistance generally and especially because of their toughness and dimensional stability over a wide temperature range, are well adapted to serve as fuel binders for cast propellants. These resins, however, are generally subject to the same limiting factors as other polymers with respect to the addition of large amounts of inorganic oxidizing materials. Thus, it is necessary to produce a thoroughly homogeneous mixture of the binder and oxidant to prevent strains which cause cracking. In addition to homogeneity, the mode of inclusion of the oxidant in the plastic binder is a factor influencing the physical characteristics of the resulting propellant grain.

Heretofore, in the preparation of solid propellant compositions containing an inorganic oxidizer, the oxidizer has been added to an organic monomer or to a solution of a polymer dissolved in a suitable solvent. In the former case inhomogeneities of the propellant grains produced from such compositions are caused by incomplete mixing of the polymer with the oxidant, and this is particularly the case when rapidly setting resins and resins polymerizing exothermically are used as fuel binders. In the latter case the composition requires considerable heat and pressure for molding, after removal of the solvent, and the resulting propellant grain is relatively weak physically.

It is accordingly the primary object of this invention to prepare epoxy plastic compositions containing large amounts of inorganic oxidizing material and capable of forming castings which possess the requisite strength and toughness to render them suitable for use as propellant grains.

It is a further object of this invention to furnish an improved method for the dispersion of large amounts of inorganic oxidizer in an epoxy polymer.

It is a still further object of this invention to provide an improved mode of incorporation of inorganic oxidant in the epoxy polymer.

Additional objects will become apparent hereinafter.

By the process of the present invention, compositions useful in the preparation of solid propellants are prepared by dissolving the resin precursor, which is composed predominantly of monomeric molecules, in an organic solvent prior to adding the oxidizer and initiating a reaction of the monomeric material. This dilution of the monomer acts to dissipate the heat generated by the reaction and to prevent localized overheating. A homogeneous dispersion of the oxidant in the plastic is obtained because of the long interval during which the viscosity of the mixture is low enough to permit stirring but high enough to prevent the settling out of the inorganic oxidizing particles.

The monomeric material is converted into a thermosetting plastic by a two step process comprising, as a first step, the formation of large molecules composed of a plurality of long chains and, as a second step, the crosslinking of these long chains. The solvent is evaporated during the first step, at which stage the mass is still capable of cold flow. This viscous material is poured into molds and compressed into desired shapes without heat and cured by standing at ambient temperature followed by a post cure of several hours at a somewhat elevated temperature.

The final crosslinking of the linear chains results in a three dimensional structure in which the oxidant particles are enveloped by the plastic cells.

The major ingredient used in making the binder is the diglycidyl ether which corresponds to the following formula:

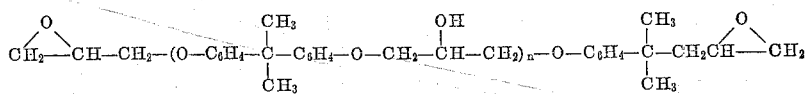

where $n$ is zero. This monomer is formed by the well known reaction between 4-4'dihydroxy-diphenyl-dimethyl-methane and an excess of epichlorohydrin in the presence of an alkaline condensing agent, e.g. caustic soda, and when in the purified form is a solid melting at about 45° C. As commonly encountered, and used in this invention, this diglycidyl ether contains a small amount of polymeric material and corresponds to an "$n$ value" of 0.10. Because of these impurities, the diglycidyl ether is in a liquid form. It has a very long shelf life if not subjected to temperatures in the neighborhood of 200° C. or to the action of a catalyst. Materials suitable for use in this invention are available under the trade names of Epon (Shell Chemical Corp.), Araldite (Ciba Co.), or Epi-Rez (Devoe-Raynolds Co.).

The above diglycidyl ether is converted into large molecules having a plurality of linear chains by condensing the ether with an aliphatic polyamine. The condensation reaction takes place in an organic solution of the diglycidyl ether and polyamine and in the presence of the inorganic oxidant which is continually stirred into the thickening plastic. Inasmuch as the reaction is exothermic, the heat generated vaporizes the organic solvent during the course of the reaction.

The amount of polyamine used is between one half and a full stoichiometric amount in excess of the amount of polyamine consumed by reactions with traces of chloride and other impurities which may be present. The condensation product accordingly results in tertiary aliphatic amines which are in the form of $\beta$-hydroxylamino polymer chains terminated by epoxy groups.

The above polymer chains can be converted into a three dimensional polymer by a crosslinking between chains. This crosslinking depends upon a reaction of the terminal epoxy groups and the alcoholic groups previously formed as a result of the condensation of epoxy and amino groups, and is catalyzed by the tertiary amines also formed by the condensation reaction. Crosslinking is effected, after vaporization of the solvent, by transferring the mixture to molds and subjecting it to pressure. A post cure at a somewhat elevated temperature gives propellant grains of superior physical properties.

Aliphatic polyamines form tertiary amine nuclei of sufficient catalytic activity to effect the subsequent crosslinking reaction necessary in this invention. Since the reaction between amino hydrogens and epoxy groups is much faster than etherification reactions, no appreciable crosslinking will take place until the condensation reaction has proceeded to the point of building up a large concentration of tertiary amine. Polyamines useful in this invention include ethylenediamine, diethylenetriamine, triethylenetetramine, 1,-6-hexanediamine, and other aliphatic polyamines containing only primary and secondary amino groups.

Methylene chloride has been found to be exceptionally well suited for use as a solvent of the reacting materials. It has good solvent properties and because of its low boiling point it vaporizes readily and is completely removed from the composition during the condensation reaction.

In order that those skilled in the art may better understand how the present invention may be practiced, the following example is given by way of illustration and not by way of limitation:

150 grams of a diglycidyl ether corresponding to the formula

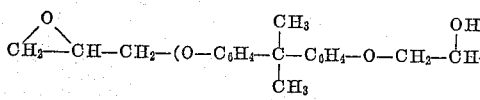 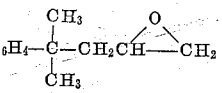

wherein $n$ is zero in the case of at least 75% of the molecules and one for the remainder, were dissolved in 300 grams of methylene chloride. 850 grams of 270-300 mesh ammonium prechlorate and 11 grams of triethylene tetramine were added to this solution. These constituents were mixed in a household type of mixer equipped with two eccentrically mounted agitators of the whipping type. The mixing operation required above one hour at atmospheric pressure, resulting in a somewhat stiff, tacky paste which could be readily broken into lamps.

The lumpy material resulting from the mixing process was then loaded into conical preform molds of stainless steel varying in diameter from 1⅛ to 1⅜ inches, the molds first being given a thin coat of Ortholeum 162 (a viscous liquid comprising a phosphate of long chain alcohols), followed by aluminum powder to act as a mold release. After the molds were loaded with the uncured propellant, the material was given a preliminary pressing at about 200 p.s.i.

Thirteen pellets were made by subjecting the plastic in the molds to varying higher pressures and curing cycles. The first five molds were evacuated to 4 cm. Hg in order to emit trapped air and then compressed at 1800 p.s.i. Molds six through 13 were not evacuated but were compressed at 2200 p.s.i. The curing cycle of the pellets included a period during which the pellet was held at room temperature followed by a period during which it was held at a temperature between 60 and 100° C. except pellet number 6 which was cured at room temperature only. The procedure used for each of the 13 pellets is shown in the following table:

*Compression and curing of pellets containing 85% ammonium perchlorate*

| Pellet No. | Air pressure (cm. Hg) | Compression pressure (p.s.i.) | Curing time in hours at designated temperature | | | | |
|---|---|---|---|---|---|---|---|
| | | | Room temp. | 60° C. | 70° C. | 80° C. | 100° C. |
| 1 | 4 | 1,800 | 96 | | | | 4 |
| 2 | 4 | 1,800 | 5 | 18 | | | |
| 3 | 4 | 1,800 | 5 | | 18 | | |
| 4 | 4 | 1,800 | 5 | | | 18 | |
| 5 | 4 | 1,800 | 5 | | | | 18 |
| 6 | 76 | 2,200 | 120 | | | | |
| 7 | 76 | 2,200 | 5 | 18 | | | |
| 8 | 76 | 2,200 | 5 | | 18 | | |
| 9 | 76 | 2,200 | 5 | | | 18 | |
| 10 | 76 | 2,200 | 5 | | | | 18 |
| 11 | 76 | 2,200 | 23 | | | 2 | |
| 12 | 76 | 2,200 | 23 | | | | 2 |
| 13 | 76 | 2,200 | 23 | | | | 4 |

Pellet No. 6 was too soft to be machined and was evidently undercured. However, there were no differences in physical properties among the remainder of the specimens which could be attributed to any preferred curing cycle among those tabulated. Sections machined from these pellets failed to disclose any cracks, although there were a number of small air voids in all specimens. The densities of the pellets were measured as 1.57±.02 grams per cubic centimeter. Compression tests for the various pellets gave yield points varying between 3440 and 4910 p.s.i. and ultimate compressive strengths varying between 5680 and 6450 p.s.i. using a Riehle Universal testing machine. Indentations of between 1.25 and 1.40 mm. were obtained with a ⅛ inch diameter steel ball under a load of 15 kilograms for 15 seconds, using a Rockwell hardness testing machine.

The above disclosed method for preparing a propellant is not limited to the use of ammonium perchlorate as oxidant but other commonly used oxidizing materials, e.g., sodium, ammonium, or potassium nitrate, potassium perchlorate, and the like, may also be used. It should also be noted that general features of the method disclosed herein are applicable to processes for preparing propellants from monomeric materials other than the epoxy monomers as disclosed herein.

Obviously modifications and variations of the present invention are possible in the light of the above teachings. Accordingly any departure from the above description which is within the principles of this invention is intended to be included within the scope of the claims below.

What is claimed is:

1. A process for preparing a solid propellant composition which comprises dissolving a diglycidyl ether consisting essentially of monometric molecules and corresponding to the formula

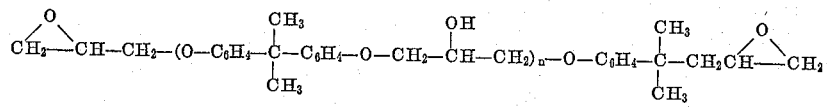

wherein $n$ equals zero for more than 75% of the molecules and equals one for the remainder, in a low boiling organic solvent, adding an inorganic oxidant and one half of a stoichiometric amount of an aliphatic polyamine, the reactive groups of the said polyamine consisting of amino groups containing at least one replaceable hydrogen atom, homogenizing the mixture until the organic solvent has evaporated, pouring the mixture in molds and compressing at ambient temperature and finally heating the compressed mixture to a temperature between 60 and 100° C. for a period of 18 to 2 hours, the time of heating varying inversely with the temperature.

2. The process according to claim 1 wherein the organic solvent is methylene chloride.

3. The process according to claim 1 whereby the polyamine is triethylenetetramine.

4. The process according to claim 1 wherein the inorganic oxidant is ammonium perchlorate.

5. A propellant composition made according to the process of claim 1.

6. A composition corresponding to claim 5 wherein the aliphatic polyamine is triethylenetetramine.

7. A composition corresponding to claim 5 wherein the inorganic oxidant is ammonium perchlorate.

8. A composition corresponding to claim 5 wherein the amounts of plastic binder and inorganic oxidant are 15% and 85%, respectively.

References Cited by the Examiner
UNITED STATES PATENTS

| | | | |
|---|---|---|---|
| 2,952,530 | 9/60 | St. John | 149—19 |
| 3,130,096 | 4/64 | Pruitt et al. | 149—19 |

CARL D. QUARFORTH, *Primary Examiner.*